United States Patent
Liu

(10) Patent No.: US 11,533,169 B2
(45) Date of Patent: *Dec. 20, 2022

(54) METHOD FOR ROLE-BASED DATA TRANSMISSION USING PHYSICALLY UNCLONABLE FUNCTION (PUF)-BASED KEYS

(71) Applicant: TAIWAN SEMICONDUCTOR MANUFACTURING COMPANY LTD., Hsinchu (TW)

(72) Inventor: Mei-Chien Liu, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 22 days.

This patent is subject to a terminal disclaimer.

(21) Appl. No.: 17/115,401

(22) Filed: Dec. 8, 2020

(65) Prior Publication Data

US 2021/0091932 A1 Mar. 25, 2021

Related U.S. Application Data

(63) Continuation of application No. 15/937,230, filed on Mar. 27, 2018, now Pat. No. 10,868,669.

(60) Provisional application No. 62/572,940, filed on Oct. 16, 2017.

(51) Int. Cl.
| | | |
|---|---|---|
| *H04L 29/00* | (2006.01) | |
| *H04L 9/08* | (2006.01) | |
| *H04L 9/32* | (2006.01) | |
| *H04L 9/40* | (2022.01) | |

(52) U.S. Cl.
CPC .......... *H04L 9/0825* (2013.01); *H04L 9/0866* (2013.01); *H04L 9/0894* (2013.01); *H04L 9/3242* (2013.01); *H04L 9/3278* (2013.01); *H04L 63/0442* (2013.01)

(58) Field of Classification Search
CPC ... H04L 9/0825; H04L 9/0866; H04L 9/0894; H04L 9/3242; H04L 9/3278; H04L 63/0442
See application file for complete search history.

(56) References Cited

U.S. PATENT DOCUMENTS

| | | | | |
|---|---|---|---|---|
| 9,853,812 | B2 * | 12/2017 | Mehta | G06F 21/604 |
| 10,002,277 | B1 * | 6/2018 | Endress | G09C 1/00 |
| 2004/0015689 | A1 * | 1/2004 | Billhartz | H04L 9/3268 713/156 |
| 2006/0047960 | A1 * | 3/2006 | Ono | H04L 9/0891 713/171 |
| 2014/0189890 | A1 * | 7/2014 | Koeberl | G06F 21/70 726/34 |

(Continued)

*Primary Examiner* — Ghazal B Shehni
(74) *Attorney, Agent, or Firm* — WPAT; Anthony King

(57) ABSTRACT

A method includes encrypting a first message that contains a first public key of a first peer, by using a second public key of a second peer; and decrypting a second message sent from the second peer by using a first private key paired with the first public key. The second message includes a write command and is encrypted at the second peer by using the first public key, and contains an encrypted data encrypted by the second peer using the second public key and hashed by using a secret key of the first peer. The first public key, the second public key, the first private key and the secret key are physically unclonable function (PUF)-based keys.

20 Claims, 8 Drawing Sheets

(56) References Cited

U.S. PATENT DOCUMENTS

2016/0036784 A1\* 2/2016 Jimenez ............... H04L 63/061
                                                                          713/171

\* cited by examiner

METHOD FOR ROLE-BASED DATA TRANSMISSION USING PHYSICALLY UNCLONABLE FUNCTION (PUF)-BASED KEYS

CROSS-REFERENCE TO RELATED APPLICATION

This application claims the benefit of U.S. Provisional Application No. 62/572,940, filed Oct. 16, 2017, and U.S. application Ser. No. 15/937,230, filed Mar. 27, 2018.

BACKGROUND

Physically Unclonable Function (PUF) is hardware analog of a one-way function which can address hardware security issues such as device authentication, generating secret keys, and producing seeds for random number generators. Today, PUFs are usually implemented in integrated circuits and are typically used in applications with high security requirements. Although manufactured in high volume, each integrated circuit (IC) is unique due to the physical randomness even with the same manufacturing process and the same material. The security of the PUF is based on the fact that practically any circuit cannot be mimicked exactly due to the process variations present in its components. Hence, it is almost impossible for the adversary to predict the responses. The more random the process variations in the PUF is, the more difficult it is for a third party to clone the PUF. This inherent variation can be extracted and used as its unique identification, as DNA to human beings. Recently, security researchers have proposed a physical "function" called PUF. A PUF in cryptography is a physical object which is easy to evaluate and produce an output but the output is very hard to predict.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
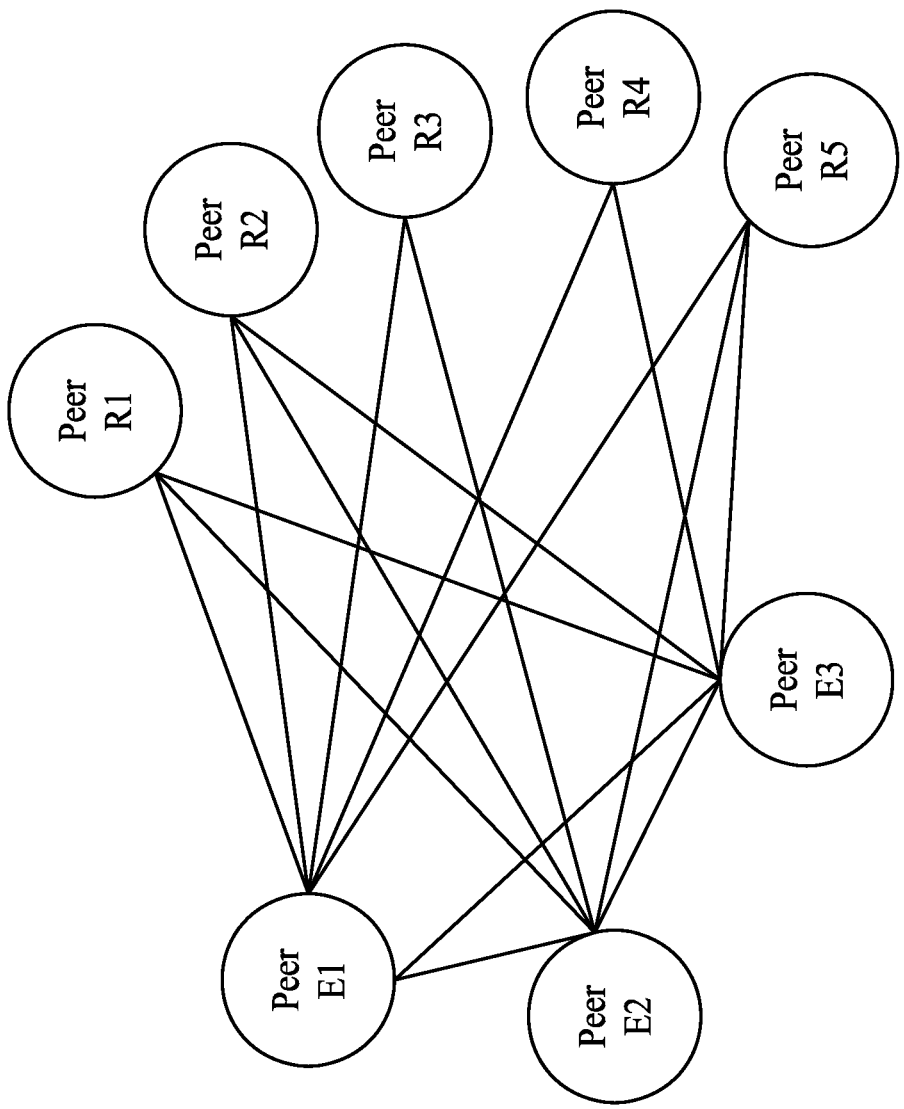
FIG. 1 is a schematic diagram of a system for data transmission using physically unclonable function (PUF)-based keys, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a method and a system to exchange a private/secret key, generated using a PUF, between a server and a client device over a physical tunnel allowing secure communication using the private or secret key.

PUFs have been used to secure communication and computing. A PUF is constructed based on different physical process variations during the manufacturing of an integrated circuit (IC). These static physical variations allow an IC to have a unique fingerprint (or multiple unique fingerprints) to the particular IC. When a particular "challenge" is presented to a PUF a corresponding unique "response" is generated. A PUF response can be used as a unique identification or key in secure computing and communication for its following properties:

Uniqueness (individualism): each PUF is distinctive and different from other all other PUFs on the same chip or on other chips;

Inherent (born with): each PUF generates its unique output based on intrinsic properties of the PUF;

Unclonable (cannot be mimicked or duplicated): it is impossible to make an exact replica even when the exact manufacturing process is used; and Repeatable (reliable): the output of a PUF should not be affected by the operation environment and age.

FIG. 1 is a schematic diagram of a system 10 for data transmission using physically unclonable function (PUF)-based keys, in accordance with some embodiments.

Referring to FIG. 1, the system 10 includes multiple peers E1 to E3 and R1 to R5. Some of the peers, for example, peers E1 to E3 include edge devices or "internet of things" (IoT) devices, while other peers, for example, peers R1 to R5 include servers or computing devices. For brevity, only three exemplary edge devices E1 to E3 and five servers R1 to R5 in the system 10 are illustrated. In the present embodiment, each of the peers R1 to R5 plays a different role for the edge devices E1 to E3. For example, the peer R1 may be a customer service provider, peer R2 an operation service provider, peer R3 a device manufacturer, peer R4 a device owner and peer R5 a technician. Each peer in the system 10 may communicate with another peer through a unique physical tunnel. These physical tunnels form a mesh network of communications, as shown in FIG. 1. In addition, each peer has a pair of PUF-based keys or a PUF-based secret key to ensure an end-to-end two-way authentication and protect data transmission over a corresponding physical tunnel.

In some existing systems, client devices like the peers E1 to E3 may possess a variety of information, which may be retrieved for different purposes by different parties like the peers R1 to R5. However, information associated with a peer should be kept confidential and is not allowed to be exposed to unauthorized parties. There is no well-defined mechanism yet for such protection. For example, given a vehicle owner as a peer in an automobile repair depot system, the peer possesses information on health data of mechanical or electronic components and parts, information on diagnostics or statistics data for mechanism learning, and information on profile setting, records in navigator and video in vision sensors. The health data should only be accessible to mechanics or technicians and are not allowed to be retrieved by others. Similarly, the diagnostics or statistics data should only be accessible to technical engineers and not the mechanics, technicians or others. Moreover, the profile setting data should only be accessible to the vehicle owner. Accordingly, these data are role-sensitive and are only accessible to authorized servers in the system.

Figure 2:
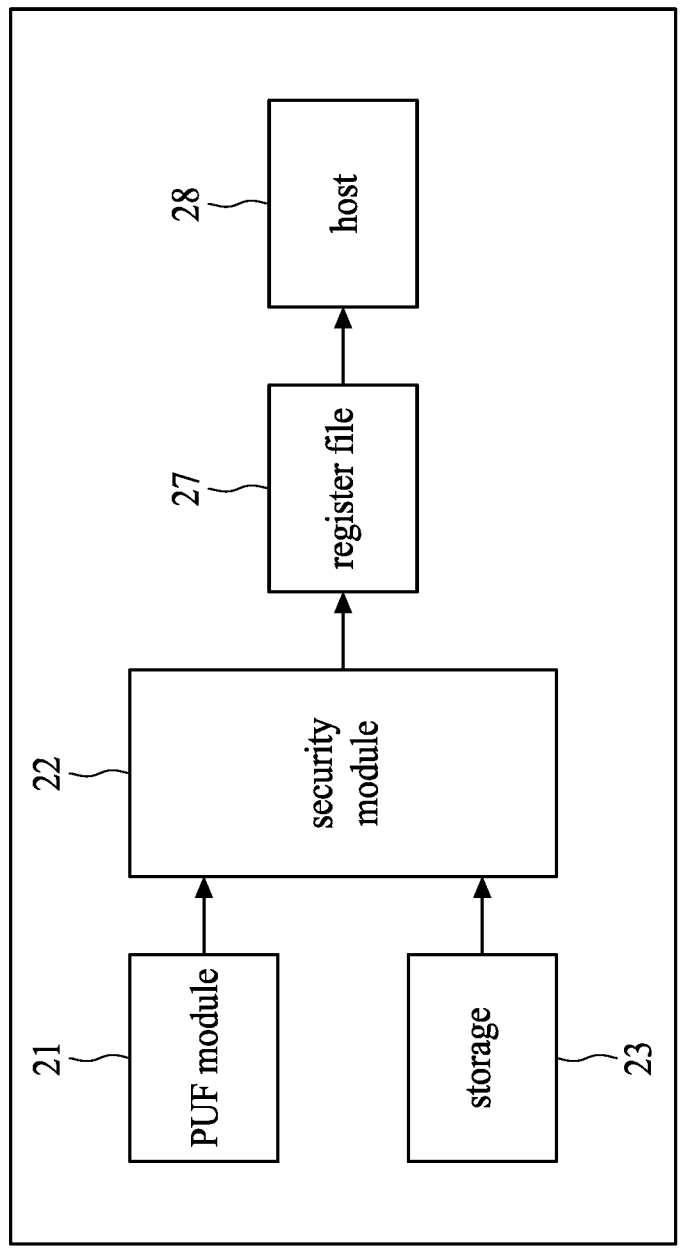
FIG. 2 is a block diagram of a peer in the system illustrated in FIG. 1, in accordance with some embodiments.

FIG. 2 is a block diagram of a peer 20 in the system 10 illustrated in FIG. 1, in accordance with some embodiments. Referring to FIG. 2, the peer 20 includes a PUF module 21, a security module 22, a storage 23, a register file 27 and a host 28.

The PUF module 21 is configured to generate a random number. The security module 22 is configured to, based on a random number from the PUF module 21 or a challenge from another peer, generate a secret key and a pair of public key and private key. An algorithm that uses just one key, which has to be a secret between a sender peer and recipient peer, is called symmetric, and the key is called a secret key. An algorithm that uses a private key and a public key is called asymmetric.

In an embodiment, Diffie-Hellman key exchange protocol is used between a pair of peers without a private secure channel. The Diffie-Hellman key exchange protocol is a specific method of securely exchanging cryptographic keys over a public channel, and allows two peers that have no prior knowledge of each other to jointly establish a shared secret key over an insecure channel. This key can then be used to encrypt subsequent communications using a symmetric key cipher.

In another embodiment, asymmetric cryptography like Rivest-Shamir-Adleman (RSA) or Elliptic Curve Cryptography (ECC) is used between a pair of peers. RSA cryptosystem is based on a mathematical one-way function allowing message to be encrypted with a public key that can only be decrypted with the corresponding private key.

The storage 23, for example, a non-volatile memory, is configured to store public keys and secret keys of other peers. These public keys and secret keys may be preprogrammed when the peer IC is manufactured or obtained afterwards when the peer IC is used in the system 10.

The register file 27 serves as an interface between the security module 22 and the host 28. The register file 27 may include an array of registers for storing encrypted data generated by a crypto module, which will be discussed with reference to FIG. 3.

The host 28 serves as an agent for data transmission and key distribution between the peer 20 and another peer in the system 10.

Figure 3:
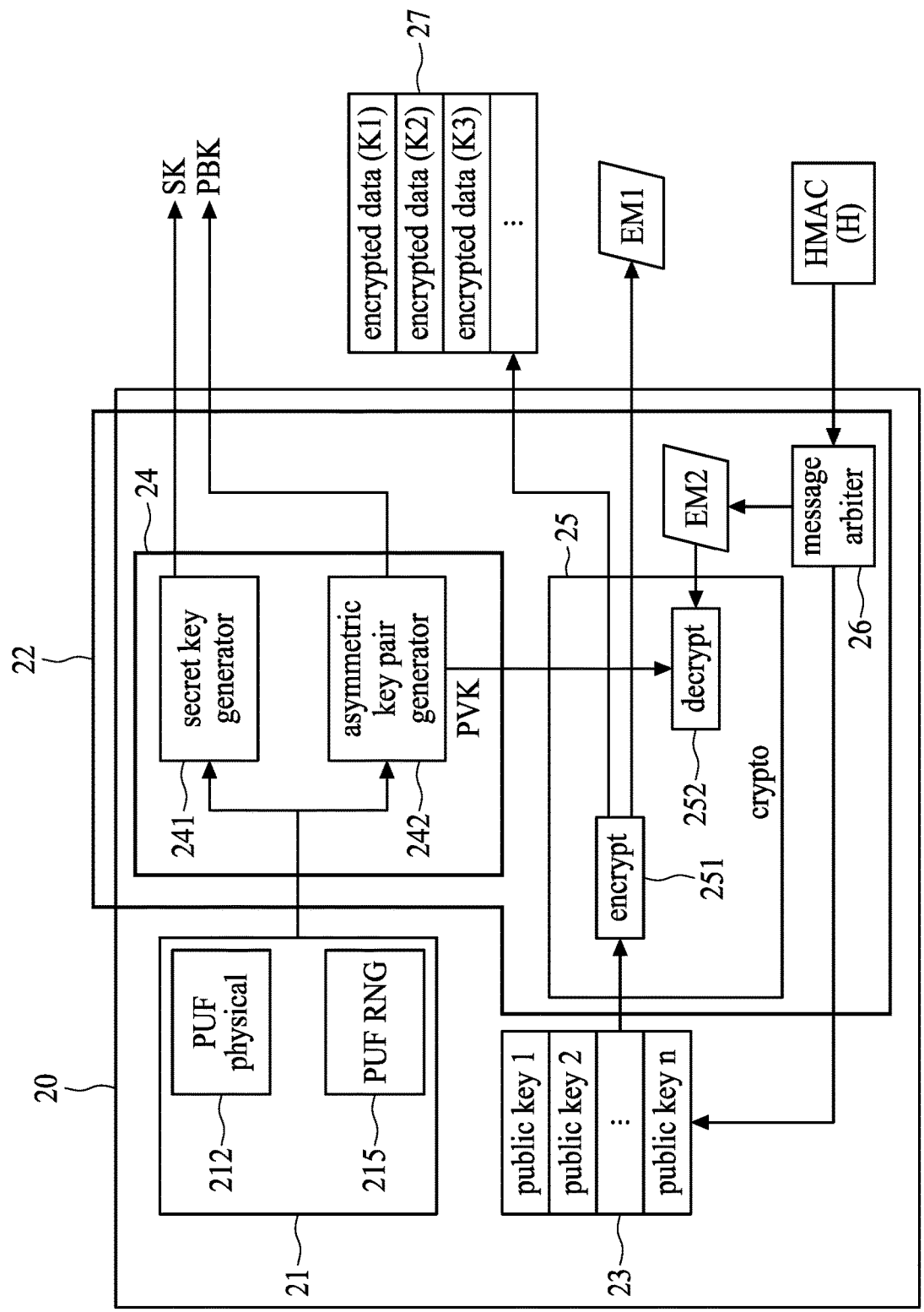
FIG. 3 is a schematic diagram of the peer illustrated in FIG. 2, in accordance with some embodiments.

FIG. 3 is a schematic diagram of the peer 20 illustrated in FIG. 2, in accordance with some embodiments.

Referring to FIG. 3, the PUF module 21 includes a PUF physical 212 and a PUF-based random number generator (PUF RNG) 215. The PUF physical 212 refers to logic and analog circuits of the PUF module 21. The PUF RNG 215 generates a random number that is subsequently used in the security module 22 for generating a secret key SK and a pair of public key PBK and private key PVK.

The security module 22 includes a key generator 24, a crypto module 25 and an arbitrator 26. The key generator 24 further includes a first key generator 241 and a second key generator 242. The first key generator 241 is configured to generate a secret key SK in response to a random number from the PUF module 21. The second key generator 242 is configured to generate a pair of public key PBK and private key PVK in response to the random number from the PUF module 21.

The crypto module 25 further includes an encrypt module 251 and a decrypt module 252. The encrypt module 251 is configured to encrypt data by using a public key or secret key stored in the storage 23, resulting in an encrypted message EM1. The public key and secret key belong to a recipient of the encrypted message EM1. Data encrypted by the encrypt module 25 may include a public key or a secret key or both of the peer 20. The encrypted data are stored in the register file 27.

In contrast, the decrypt module 252 is configured to decrypt an encrypted message EM2 by using a private key or secret key belong to the peer 20. In the present embodiment, the encrypted message EM2 is contained in a hashed data H using hash-based message authentication code (HMAC). The arbitrator 26 is configured to determine if the sender of the hashed data H is an authorized peer by, for example, checking if the sender peer has a corresponding public key or secret key in the storage 23. If affirmative, the encrypted message EM2 is obtained from the hashed data H by the arbitrator 26 for further processing in the peer 20. If the sender peer is not an authorized peer, no encrypted message can be obtained from the hashed data H.

Figure 4:
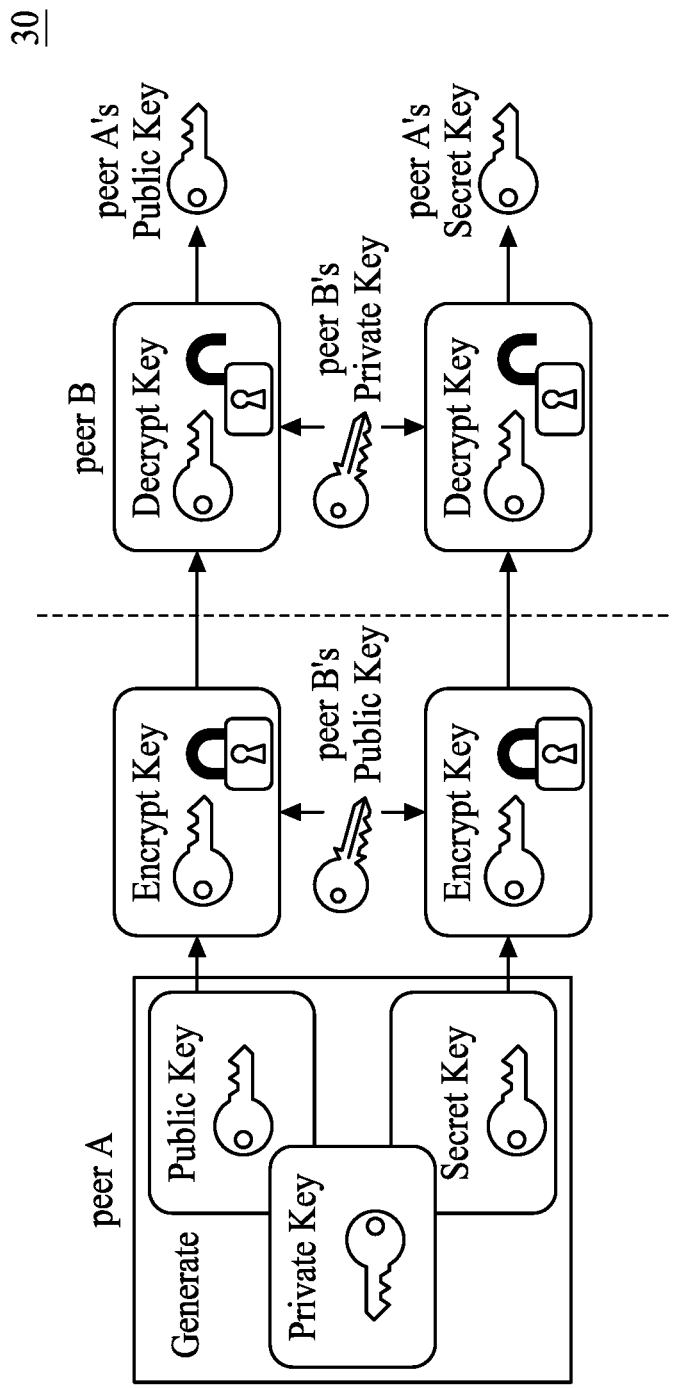
FIG. 4 is a schematic diagram showing a method of key transmission, in accordance with some embodiments.

FIG. 4 is a schematic diagram showing a method of key transmission, in accordance with some embodiments.

Referring to FIG. 4, a pair of public key and private key is generated at a peer A. Peer A encrypts the public key by using a public key of a peer B. Peer B's public may be preprogrammed or obtained in a registration process. Peer A then sends a message including the encrypted public key to peer B. Peer B receives the message and then decrypts the received message by using a private key of peer B corresponding to the public key of peer B that is used to encrypt the message by peer A. Subsequently, the public key of peer A is obtained after the decrypting process. Peer B, to send data to peer A, may then encrypt the data by using the peer A's public key.

Likewise, a secrete key is generated at peer A. Peer A encrypts the secret key by using a public key of peer B. Peer A then sends a message including the encrypted secret key to peer B. Peer B receives the message and then decrypts the received message by using a private key of peer B corresponding to the public key of peer B that is used to encrypt the message by peer A. Subsequently, the secret key of peer A is obtained after the decrypting process. Peer B, to send data to peer A, may then hash the data by using the peer A's secret key.

Figure 5:
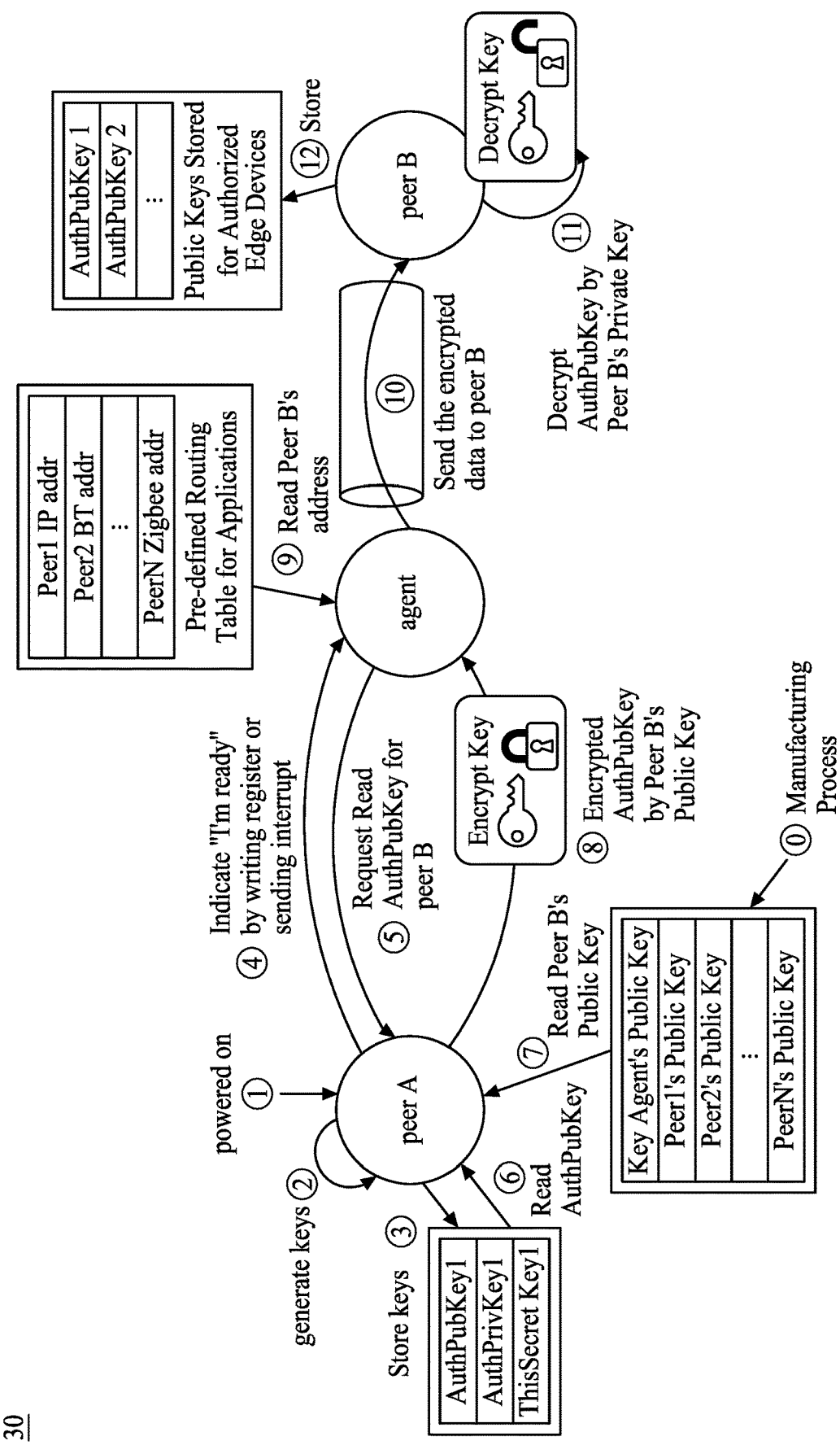
FIG. 5 is a schematic diagram showing the method of key transmission illustrated in FIG. 4 in detail.

FIG. 5 is a schematic diagram showing the method of key transmission illustrated in FIG. 4 in detail.

Referring to FIG. 5, during a manufacturing process of peer A, public keys of peers 1 to N, for example, are preprogrammed in a storage of peer A. Peer A may generate a secret key and a pair of public key and private key when powered on, and store these keys. Peer A is available for key transmission. An agent, for example, peer A's host, requests an authenticate public key of peer A. The agent keeps a table of pre-defined addresses of the peers 1 to N to facilitate communication between peer A and each of the peers 1 to N. The public key of peer A is then retrieved in order for transmission to peer B. Moreover, the preprogrammed public key of peer B is also retrieved. The public key of peer A is then encrypted by using peer B's public key. Peer B's address, such as an Internet Protocol (IP) address, a Bluetooth (BT) address or a Zigbee address, is fetched from the table. Subsequently, an encrypted data including peer A's public key is sent over a physical tunnel to peer B. Peer B decrypts the encrypted data by using peer B's private key corresponding to the preprogrammed peer B's public key. Peer A's public key is obtained after decryption and stored at peer B. As a result, peer B is allowed to send data encrypted using peer A's public key to peer A over the physical tunnel. In addition, data sent between peers A and B or any other peer in the mesh network over the physical tunnel has been encrypted using the recipient peer's public key. No third party in between can decrypt the encrypted data without knowing the recipient's corresponding private key.

The secret key of peer A is sent to peer B in a similar fashion and thus is not discussed for brevity.

Figure 6:
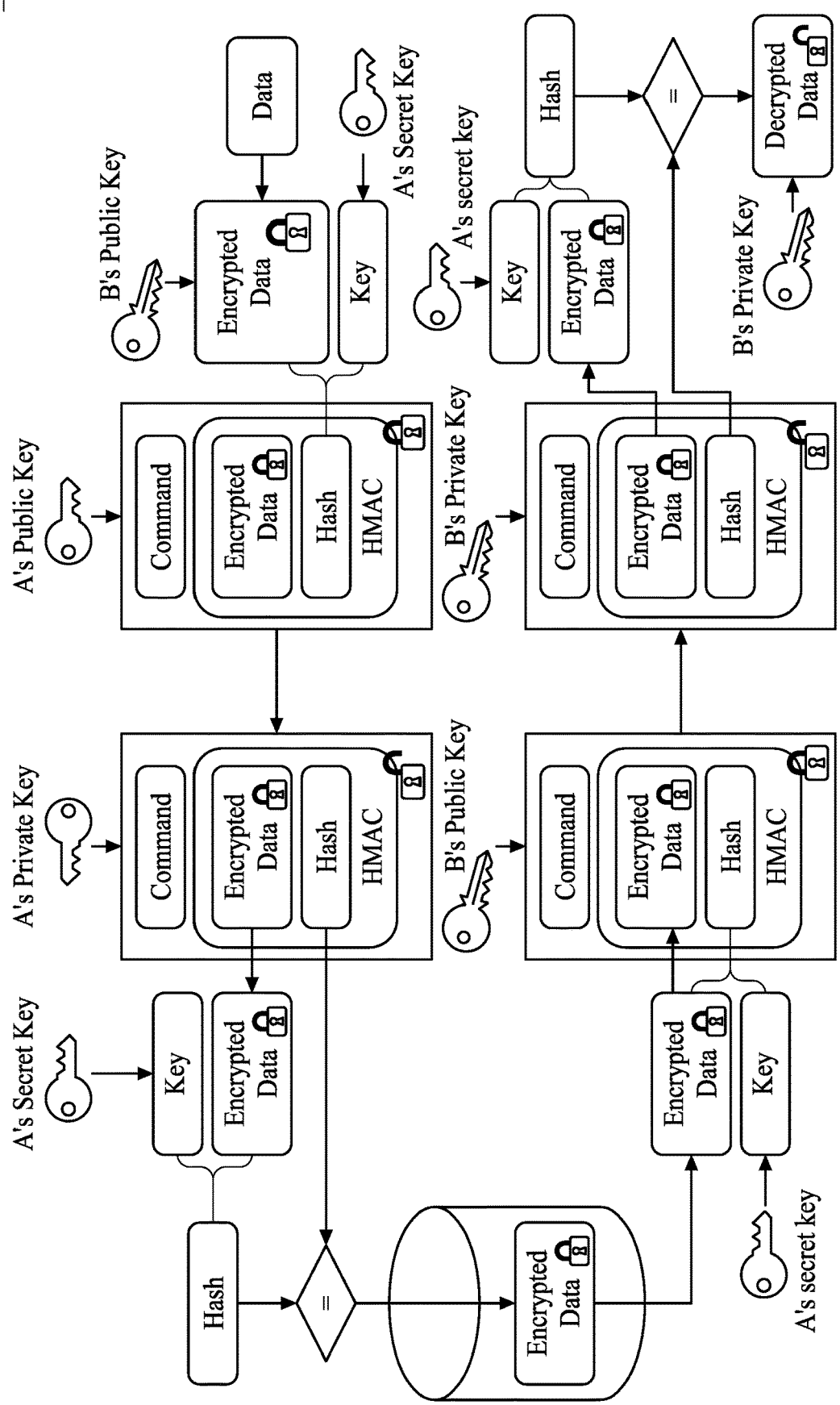
FIG. 6 is a schematic diagram showing a method of data transmission in the system illustrated in FIG. 1, in accordance with some embodiments.

FIG. 6 is a schematic diagram showing a method of data transmission in the system illustrated in FIG. 1, in accordance with some embodiments.

Referring to FIG. 6, having obtained peer A's public key and secret key during the key transmission process as described and illustrated with reference to FIG. 4 or 5, peer B is allowed to send data to peer A. The data to be sent to peer A is encrypted by using peer B's public key. Without peer B's private key, peer A is not able to decrypt the encrypted data. As a result, the encrypted data is kept undecrypted or confidential at peer A. The encrypted data is then hashed in a hash function like HMAC SHA-256 by using peer A's secret key, resulting in a hash-based data with a first hash value. The hashed data and a command are encrypted by using peer A's public key, resulting in an encrypted message. The command may include a write command, requesting peer A to write the encrypted data. The encrypted message including the hashed data and the command is subsequently sent to peer A.

When the encrypted message from peer B is received, peer A decrypts it by using peer A's private key. As a result, the command from peer B and the encrypted data are obtained. Further, peer A determines a second hash value by hashing the encrypted data in a hash function by using peer A's secret key. The second hash value is compared against the first hash value. If they are equal, data integrity of the encrypted data is verified. The encrypted data is stored at peer A in accordance with the command. Without peer B's private key, the encrypted data stored at peer A cannot be decrypted even hacked by a malicious third party.

When peer B wants to retrieve the encrypted data from peer A, peer B may encrypts a read command together with peer B's secret key by using peer A's public key and sends an encrypted message to peer A. Upon receiving the encrypted message, peer A decrypts it by using peer A's private key and retrieves the encrypted data in accordance with the read command. Subsequently, peer A hashes the encrypted data in a hash function by using peer A's secret key, resulting in a hashed data with a third hash value. The hashed data and a command are encrypted by using peer B's public key, resulting in an encrypted message. The encrypted message is then sent to peer B.

When the encrypted message from peer A is received, peer B decrypts it by using peer B's private key. As a result, the encrypted data are obtained. Further, peer B determines a fourth hash value by hashing the encrypted data in a hash function by using peer A's secret key. The fourth hash value is compared against the third hash value. If they are equal, the encrypted data may then be decrypted by using peer B's private key and thus the original data is obtained.

Figure 7:
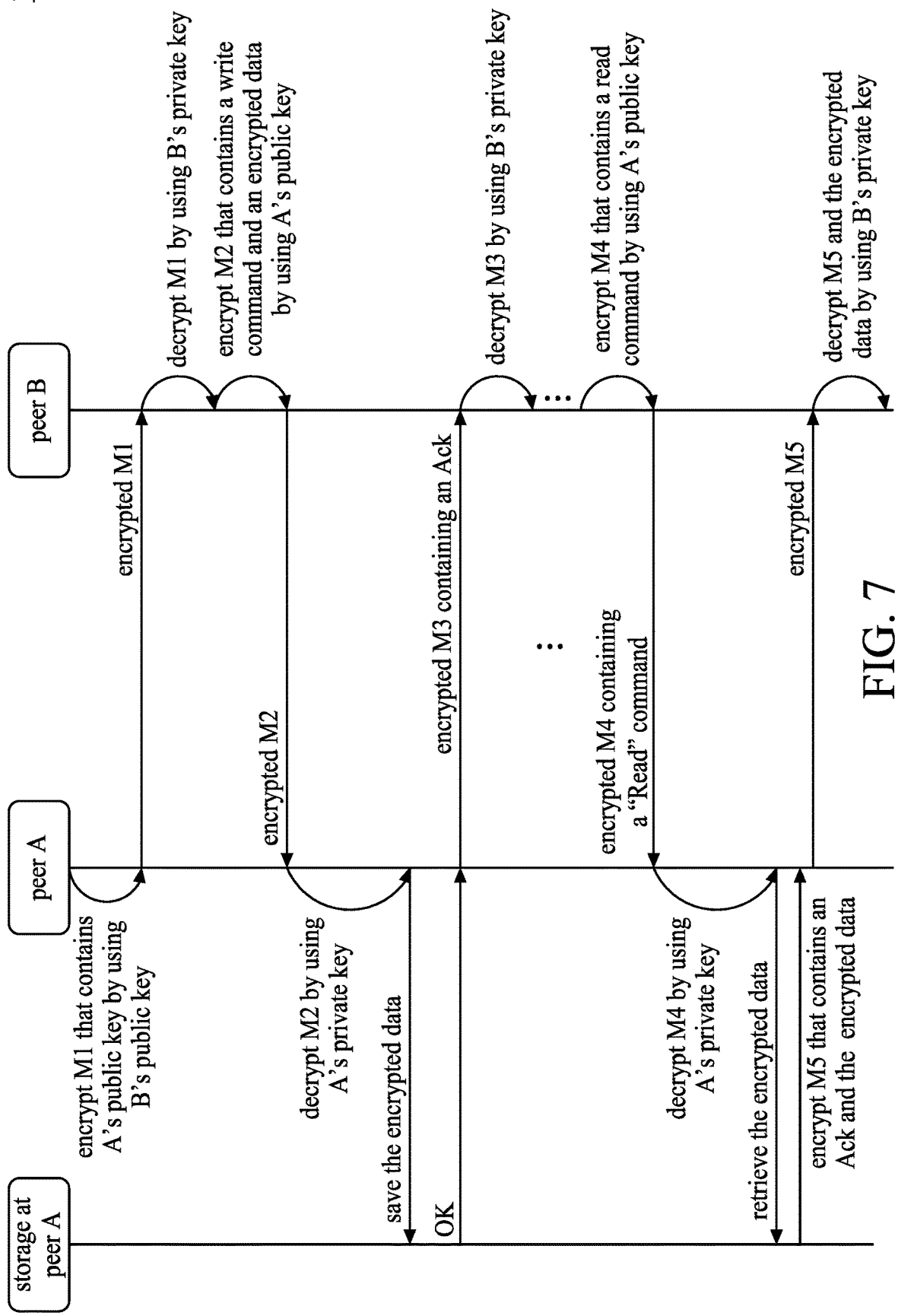
FIG. 7 is a flow chart showing a method of data exchange between a pair of peers using PUF-based keys, in accordance with some embodiments.

FIG. 7 is a flow chart showing a method of data exchange between a pair of peers using PUF-based keys, in accordance with some embodiments.

Referring to FIG. 7, peer A encrypts a first message M1 that contains peer A's public key by using B's public key. Peer B's public key is preprogramed and stored in peer A's storage. The encrypted first message M1 is then sent to peer B. Likewise, peer A sends an encrypted message including peer A's secret key to peer B.

Peer B decrypts the first message M1 by using B's private key and thus obtains peer A's public key. Likewise, peer B obtains peer A's secret key. Peer B then encrypts a data by using peer B's public key. The encrypted data is hashed in a hash function by using peer A's secret key. Peer B then encrypts a second message M2 that contains a write command and the hashed encrypted data by using peer A's public key. The encrypted second message M2 is sent to peer A.

Peer A decrypts the encrypted second message M2 by using peer A's private key and obtains the encrypted data. Peer A checks the data integrity of the encrypted data by comparing hash values. If the hash values are equal, which means that data integrity is not compromised in the transmission, the encrypted data is stored at peer A. Since peer A has no peer B's private key, the encrypted data is kept undecrypted at peer A. Peer A may subsequently send an encrypted third message M3, acknowledging that the encrypted data is received and written in accordance with the write command.

Peer B decrypts the third message M3 by using peer B's private key and thus obtains the acknowledgement from peer A. Peer B may subsequently encrypts a fourth message M4 that contains a read command by using peer A's public key. The encrypted fourth message M4 is sent to peer A.

Peer A decrypts the fourth message M4 by using peer A's private key and thus obtains the read command. Peer A retrieves the encrypted data in accordance with the read command. Subsequently peer A hashes the encrypted data in a hash function by using peer A's secret key, and encrypts a fifth message M5 that contains the hashed encrypted data and an acknowledgement by using peer B's public key. Peer A then sends the encrypted fifth message to peer B. Upon receiving the fifth message M5, peer B decrypts it by using peer B's private key. Peer B hashes the encrypted data in a hash function by using peer A's secret key and determines the integrity of the encrypted by comparing the hash values.

In the present embodiment, peer A's public key and secret key are encrypted by using peer B's public key and then sent to peer B over a physical tunnel. After obtaining these keys, peer B may request peer A to write or read an encrypted data. In other embodiments, prior to data access, peer B may authenticate the identity of peer A, which will be discussed in detail with reference to FIG. 8.

Figure 8:
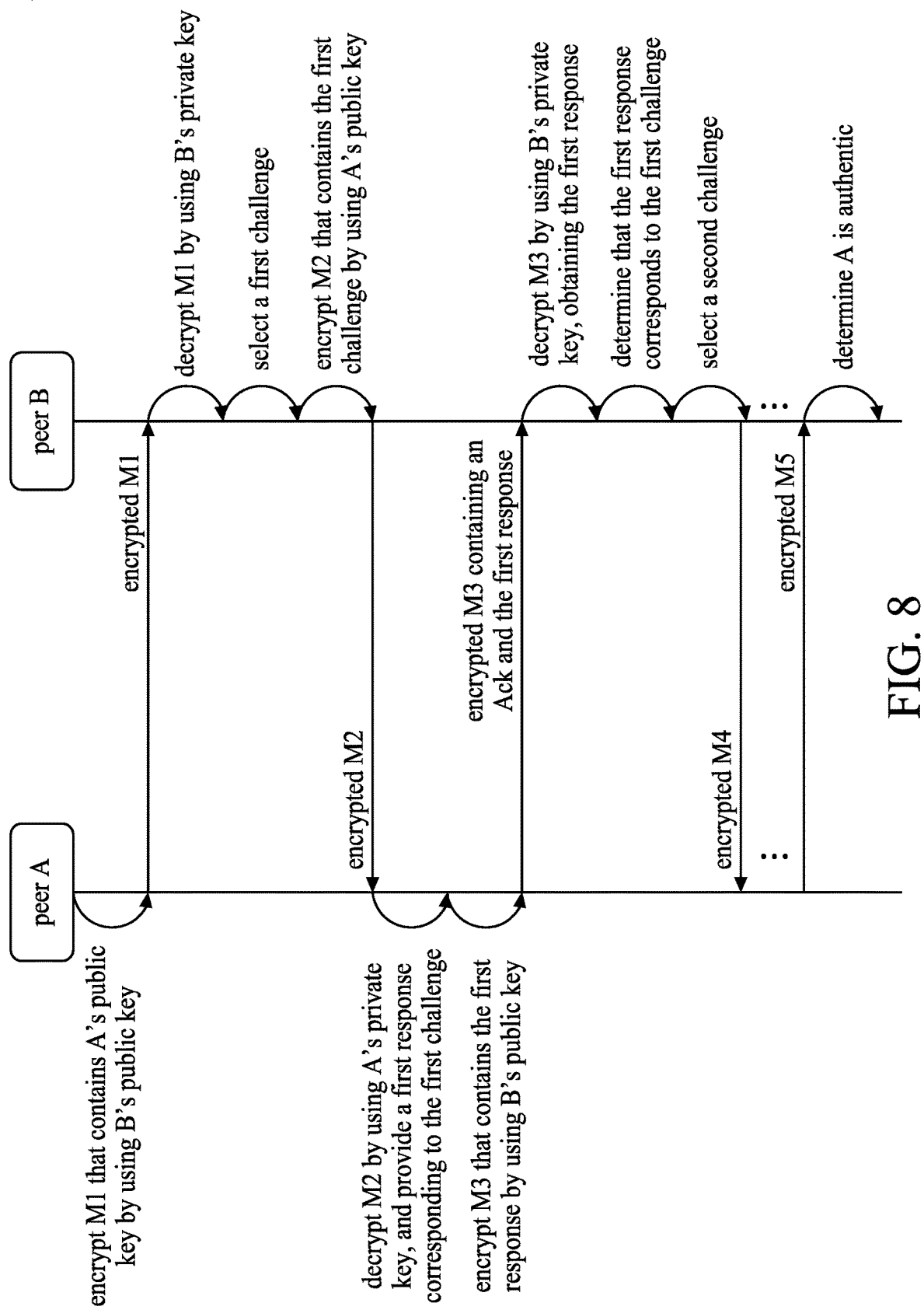
FIG. 8 is a flow chart showing a method of data exchange between a pair of peers using PUF-based keys, in accordance with some embodiments.

FIG. 8 is a flow chart showing a method of data exchange between a pair of peers using PUF-based keys, in accordance with some embodiments.

Referring to FIG. 8, peer A encrypts a first message M1 that contains peer A's public key by using B's public key, and sends the encrypted first message M1 to peer B.

Peer B decrypts the first message M1 by using peer B's private key. To authenticate the identity of peer A, peer B selects a first challenge from, for example, a lookup table or data base. At a server peer, the lookup table or database keeps tens or hundreds of challenge-response pairs that have been determined during manufacturing of each peer device in a mesh network. The challenge-response pairs may be different from peer to peer because, due to process variations in PUF circuits of the peers, a peer device is not able to, based on a same challenge, generate a response identical with that of another peer device. At a device peer, a lookup table that keeps challenge-response pairs specific to the device is enough.

Peer B then encrypts a second message M2 that contains the first challenge by using peer A's public key, and sends the encrypted second message M2 to peer A. With the lookup table, peer B can anticipate a response corresponding to the first challenge associated with peer A.

Peer A decrypts the second message M2 by using peer A's private key, and thus obtains the first challenge. By consulting a lookup table, peer A determines if the first challenge is peer A related. If not, peer A may disregard the second message M2. If affirmative, peer A identifies a first response corresponding to the first challenge in peer A's lookup table. Peer A then encrypts a third message M3 that contains the first response and an acknowledgement by using peer B's public key, and sends the third message M3 to peer B.

Next, peer B decrypts the third message M3 by using peer B's private key, and thus obtains the first response from peer A. The first response from peer A is compared against a response corresponding to the first challenge associated with peer A in the lookup table at peer B. If they are different, peer B may disregard the third message M3. If they are identical, peer B may select a second challenge associated with peer A from the lookup table, and encrypt a fourth message M4 that contains the second challenge by using peer A's public key.

Similarly, peer A decrypts the fourth message M4 by using peer A's private key, and thus obtains the second challenge. By consulting the lookup table, peer A determines if the second challenge is peer A related. If not, peer A may disregard the fourth message M4. If affirmative, peer A identifies a second response corresponding to the second challenge in peer A's lookup table. Peer A then encrypts a fifth message M5 that contains the second response and an acknowledgement by using peer B's public key, and sends the fifth message M5 to peer B.

The process of sending a challenge associated with peer A, receiving a response corresponding to the challenge and comparing the response against a particular response is repeated for a predetermined number of times, for example, ten (10) or twenty (20), until it is determined that peer A is authentic. Peer B may then initiate a write or read operation as discussed with reference to FIG. 6 or 7.

In some embodiments, the present disclosure provides a method that may include encrypting a first message that contains a first public key of a first peer, by using a second public key of a second peer; and decrypting a second message sent from the second peer by using a first private key paired with the first public key. The second message may include a write command and may be encrypted at the second peer by using the first public key, and may contain an encrypted data encrypted by the second peer using the second public key and hashed by using a secret key of the first peer. The first public key, the second public key, the first private key and the secret key may be physically unclonable function (PUF)-based keys.

In some embodiments, the present disclosure provides a method that may include decrypting a message sent from a first peer that contains a first public key of the first peer, by using a second private key of a second peer: decrypting a message sent from the first peer that contains a first secret key of the first peer, by using the second private key; encrypting a data by the second peer using a second public key of a second peer, the second public key paired with the second private key; hashing the encrypted data by using the first secret key; and encrypting a first message that contains the hashed encrypted data, by using the first public key. The first public key, the first secret key, the second public key and the second private key may be physically unclonable function (PUF)-based keys.

In some embodiments, the present disclosure provides a method that may include selecting from a lookup table a first challenge associated with a first peer; encrypting a first message that contains the first challenge by using a first public key of the first peer; receiving a second message sent from the first peer, the second message encrypted by using a second public key of a second peer and containing a first response corresponding to the first challenge; decrypting the second message by using a second private key paired with the second public key; and comparing the first response against a response corresponding to the first challenge in the lookup table. The first public key, the second public key and the second private key may be physically unclonable function (PUF)-based keys.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method, comprising:
encrypting a first message that contains a first public key of a first peer, by using a second public key of a second peer; and
decrypting a second message sent from the second peer by using a first private key paired with the first public key, the second message comprising a write command and being encrypted at the second peer by using the first public key, and the second message containing an encrypted data encrypted by the second peer using the second public key and hashed by using a secret key of the first peer;
wherein the first public key, the second public key, the first private key and the secret key are physically unclonable function (PUF)-based keys.

2. The method according to claim 1, further comprising:
encrypting a message that contains the secret key, by using the second public key; and
sending the message that contains the secret key to the second peer.

3. The method according to claim 1, further comprising:
hashing the encrypted data by using the secret key to obtain a hash value; and
comparing the hash value against a hash value associated with the hashed encrypted data.

4. The method according to claim 3, wherein the second message contains a write command, the method further comprising:
determining that the hash values are equal, and
storing the encrypted data at the first peer in accordance with the write command.

5. The method according to claim 4, further comprising:
receiving a third message that contains a read command from the second peer, the third message encrypted by using the first public key; and
decrypting the third message by using the first private key.

6. The method according to claim 5, further comprising:
retrieving the encrypted data in accordance with the read command.

7. The method according to claim 6, further comprising:
hashing the encrypted data by using the secret key; and
encrypting the hashed encrypted data by using the second public key.

8. The method according to claim 1, further comprising:
before encrypting the first message, preprogramming the second public key in a storage of the first peer.

9. A method, comprising:
decrypting a message sent from a first peer that contains a first public key of the first peer, by using a second private key of a second peer;
decrypting a message sent from the first peer that contains a first secret key of the first peer, by using the second private key;
encrypting a data by the second peer using a second public key of a second peer, the second public key paired with the second private key;
hashing the encrypted data by using the first secret key; and
encrypting a first message that contains the hashed encrypted data, by using the first public key,
wherein the first public key, the first secret key, the second public key and the second private key are physically unclonable function (PUF)-based keys.

10. The method according to claim 9, wherein the first message contains a first command requesting the first peer to write the encrypted data.

11. The method according to claim 10, further comprising, after encrypting the first message:
encrypting, by using the first public key, a second message that contains a second command requesting the first peer to send the encrypted data; and
sending the second message to the first peer.

12. The method according to claim 11, further comprising:
receiving a third message that contains the encrypted data in response to the second message, the encrypted data being hashed by using the secret key and then encrypted at the first peer by using the second public key.

13. The method according to claim 12, further comprising:
decrypting, by using the second private key, the third message sent from the first peer.

14. The method according to claim 13, further comprising:
hashing the encrypted data by using the secret key to obtain a hash value; and
comparing the hash value against a hash value associated with the hashed encrypted data.

15. The method according to claim 9, further comprising, before decrypting a message sent from the first peer that contains the first public key:
preprogramming the second public key in a storage of the first peer.

16. A method, comprising:
selecting from a lookup table a first challenge associated with a first peer;
encrypting a first message that contains the first challenge by using a first public key of the first peer;
receiving a second message sent from the first peer, the second message encrypted by using a second public key of a second peer and containing a first response corresponding to the first challenge;
decrypting the second message by using a second private key paired with the second public key;
comparing the first response against a response corresponding to the first challenge in the lookup table;
selecting from the lookup table a second challenge associated with the first peer; and
encrypting a third message that contains the second challenge by using the first public key,
wherein the first public key, the second public key and the second private key are physically unclonable function (PUF)-based keys.

17. The method according to claim 16, further comprising:
storing challenge-response pairs associated with the first peer in the lookup table.

18. The method according to claim 16, further comprising:
storing, at the first peer, challenge-response pairs associated with the first peer.

19. The method according to claim 16, further comprising:
receiving a fourth message sent from the first peer in response to the third message, the fourth message encrypted by using the second public key and containing a second response corresponding to the second challenge.

20. The method according to claim 19, further comprising:
decrypting the fourth message by using the second private key; and
comparing the second response against a response corresponding to the second challenge in the lookup table.

* * * * *